US011159263B2

(12) United States Patent
Ricker

(10) Patent No.: US 11,159,263 B2
(45) Date of Patent: Oct. 26, 2021

(54) OVERLAPPED TDM/TDMA SATELLITE RETURN COMMUNICATIONS

(71) Applicant: Hughes Network Systems, LLC, Germantown, MD (US)

(72) Inventor: Douglas R. Ricker, Frederick, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 7 days.

(21) Appl. No.: 16/724,723

(22) Filed: Dec. 23, 2019

(65) Prior Publication Data
US 2021/0194614 A1 Jun. 24, 2021

(51) Int. Cl.
*H04B 7/185* (2006.01)
*H04J 3/16* (2006.01)

(52) U.S. Cl.
CPC ........ *H04J 3/1694* (2013.01); *H04B 7/18513* (2013.01)

(58) Field of Classification Search
CPC .............. H04B 7/18513; H04B 7/2041; H04B 7/18523; H04B 7/18571; H04B 7/1851; H04B 7/18528; H04B 7/18578; H04W 84/06; H04W 72/0446; H04W 72/1268; H04W 72/1273
See application file for complete search history.

(56) References Cited

U.S. PATENT DOCUMENTS

| | | | |
|---|---|---|---|
| 6,570,859 B1 | 5/2003 | Cable et al. | |
| 7,551,575 B1 * | 6/2009 | Aleksandrowicz | .... H04Q 11/04 370/310.1 |
| 2003/0185228 A1 * | 10/2003 | Buda | ................... H04N 21/2393 370/442 |
| 2008/0043663 A1 * | 2/2008 | Youssefzadeh | .... H04B 7/18528 370/321 |
| 2009/0023384 A1 * | 1/2009 | Miller | ................... H04B 7/2041 455/12.1 |
| 2012/0140780 A1 * | 6/2012 | Chang | ..................... H04J 14/08 370/479 |
| 2020/0136671 A1 * | 4/2020 | Anderson | ........... H04L 27/2607 |

FOREIGN PATENT DOCUMENTS

WO 02/41520 A2 5/2002

OTHER PUBLICATIONS

International Search Report and Written Opinion for PCT/US2020/063228 dated Apr. 7, 2021 (11 pages).
Qian Y et al: "Integrated Connection Admission Control and Bandwidth on Demand Algorithm for a Broadband Satellite Network with Heterogeneous Traffic", IEICE Transaction on Communication, Communications Society, Tokyo, JP, vol. E89B, No. 3, Mar. 1, 2006, pp. 895-905, XP001240959, ISSN: 0916-8516, DOI: 10.1093/IETCOM/E89-B.3.895, pp. 895, 896.

* cited by examiner

*Primary Examiner* — Fred A Casca
(74) *Attorney, Agent, or Firm* — Bejin Bieneman PLC

(57) ABSTRACT

A system includes a satellite communications gateway including a first receiver. The first receiver is programmed to receive a first signal including a time-division multiplexed (TDM) return and a time-division multiple access (TDMA) return overlapped in an allocated frequency range. The receiver is further programmed to recover the time-division multiplexed return from the first signal; and output the time-division multiplexed return.

18 Claims, 6 Drawing Sheets

OVERLAPPED TDM/TDMA SATELLITE RETURN COMMUNICATIONS

BACKGROUND

In satellite communications systems, gateways typically utilize a time-division multiple access (TDMA) communications protocol to communicate with terminals for return communications. The satellite communications system may include both mobile terminals such as terminals on airplanes, trains, ships, or automobiles that may be moving hundreds of miles per hour, and stationary terminals such as terminals installed in homes. Demands on radio frequency bandwidth for satellite communications is increasing as the number of terminals increases. Further, satellite communications with mobile terminals are subject to Doppler affects due to the movement of the mobile terminals during travel which impose additional requirements on receivers compared to communications with stationary terminals.

DETAILED DESCRIPTION

Figure 1:
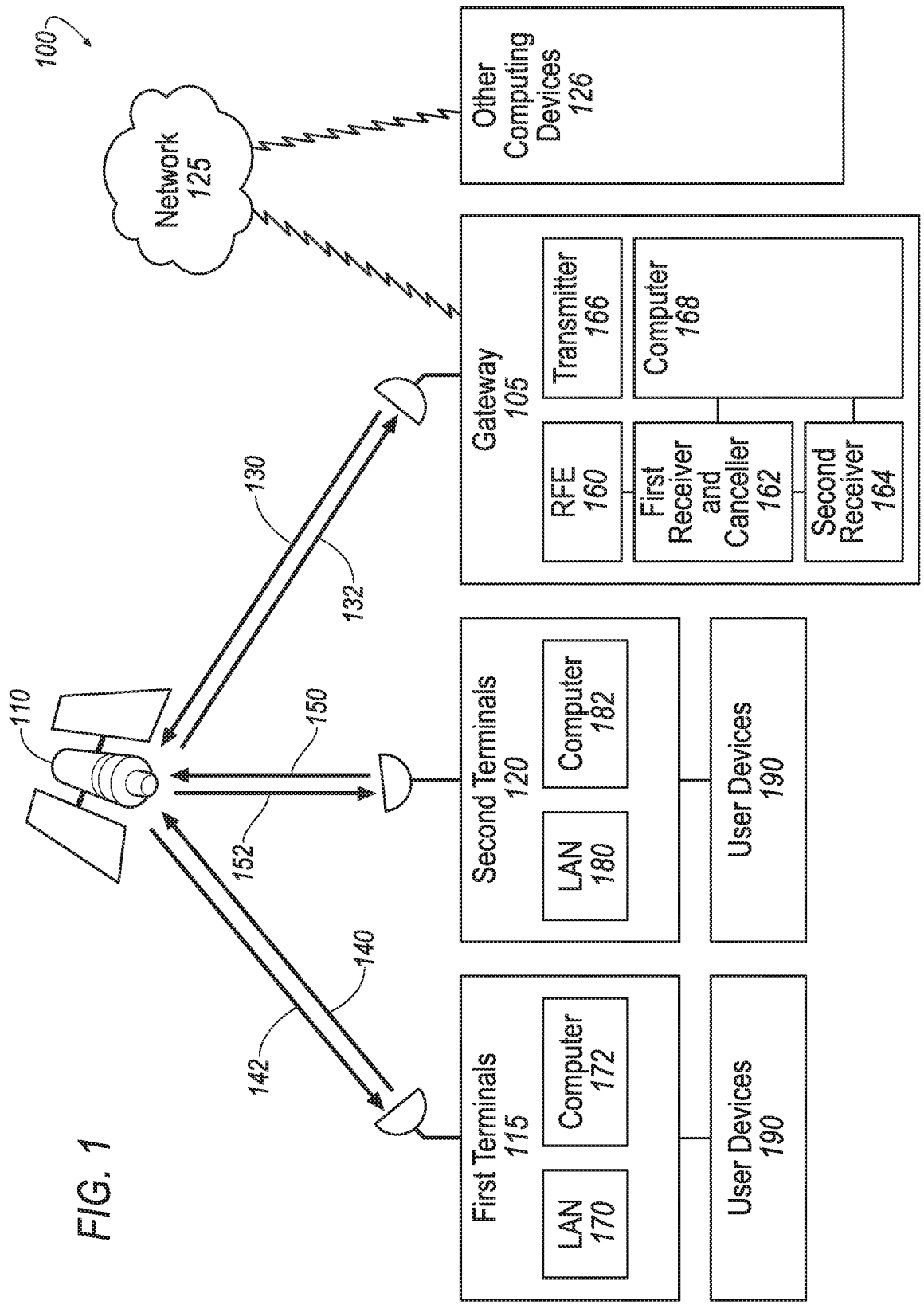
FIG. 1 is a diagram of an example system for utilizing time-division multiplexing (TDM) returns for first terminals and time-division multiple access (TDMA) returns for second terminals.

A system comprises: a satellite communications gateway that includes: a first receiver including a first processor and a first memory. The first memory includes instructions such that the first processor is programmed to: receive a first signal including a time-division multiplexed (TDM) return and a time-division multiple access (TDMA) return overlapped in an allocated frequency range; recover the time-division multiplexed return from the first signal; and output the time-division multiplexed return.

The system can comprise a second receiver, and the first processor can further be programmed to cancel the time-division multiplexed return in the first signal to generate a second signal; and output the second signal to the second receiver. The second receiver can include a second processor and a second memory, the second memory including instructions to program the second processor. The second processor can be programmed to recover the time-division multiple access return from the second signal and output the time-division multiple access return.

In the system, cancelling the time-division multiplexed return in the first signal to generate the second signal can include remodulating the TDM return after recovery.

In the system, cancelling the time-division multiplexed return in the first signal to generate the second signal can include: subtracting the remodulated TDM return from the first signal.

In the system, cancelling the time-division multiplexed return in the first signal to generate the second signal can include: delaying the first signal to synchronize the first signal with the remodulated TDM return.

In the system, the first processor can further be programmed to: reduce a sample rate of the first signal by a first down-sample factor prior to recovery of the time-division multiplexed return; and reduce a sample rate of the first signal by a second down-sample factor prior to cancelling the time-division multiplexed return in the first signal to generate the second signal.

In the system, the first processor is further programmed to: increase a sample rate of the second signal prior to outputting the second signal to the second receiver.

The system can further comprise: a first terminal enabled for both time-division multiplexed returns and time-division multiple access returns; and a second terminal enabled for time-division multiple access returns and not enable for time-division multiplexed returns; wherein the time-division multiplexed return is received from the first terminal and the time-division multiple access return is received from the second terminal.

In the system, the first terminal can be a mobile terminal and the second terminal can be a stationary terminal.

In the system, the first terminal can include a third processor and a third memory. The third memory can include instructions such that the first terminal is programmed to: initiate communications with the gateway based on time-division multiple access returns; and switch to communications based on time-division multiplexed returns based on instructions received from the gateway.

Further disclosed is a method comprising: receiving, in a first receiver, a first signal including a time-division multiplexed (TDM) return and a time-division multiple access (TDMA) return overlapped in an allocated frequency range; recovering the time-division multiplexed return from the first signal; and outputting the time-division multiplexed return.

The method can further comprise: cancelling the time-division multiplexed return in the first signal to generate a second signal; outputting the second signal to a second receiver; recovering, in the second receiver, the time-division multiple access return from the second signal and outputting the time-division multiple access return.

In the method, cancelling the time-division multiplexed return in the first signal to generate the second signal can include: remodulating the TDM return after recovery.

In the method, cancelling the time-division multiplexed return in the first signal to generate the second signal can include: subtracting the remodulated TDM return from the first signal.

In the method, cancelling the time-division multiplexed return in the first signal to generate the second signal can include: delaying the first signal to synchronize the first signal with the remodulated TDM return.

The method can further comprise: reducing a sample rate of the first signal by a first down-sample factor prior to recovery of the time-division multiplexed return; and reducing a sample rate of the first signal by a second down-sample factor prior to cancelling the time-division multiplexed return in the first signal to generate the second signal.

The method can further comprise: increasing a sample rate of the second signal prior to outputting the second signal to the second receiver.

In the method, a first terminal can be enabled for both time-division multiplexed returns and time-division multiple access returns; and a second terminal can be enabled for time-division multiple access returns and not enable for time-division multiplexed returns; wherein the time-division multiplexed return is received from the first terminal and the time-division multiple access return is received from the second terminal.

In the method, the first terminal can be a mobile terminal and the second terminal is a stationary terminal.

The method can further comprise: initiating communications with a gateway based on time-division multiple access returns; and switching to communications based on time-division multiplexed returns based on instructions received from the gateway.

A gateway in a satellite communications system is programmed to receive time-division multiplexing (TDM) returns and time-division multiple access (TDMA) returns in a same radio frequency bandwidth simultaneously. Use of the same radio frequency bandwidth for both time-division multiplexed (TDM) returns and time-division multiple access (TDMA) returns as disclosed herein has been found to be technically advantageous by providing a higher bandwidth utilization than using time-division multiple access (TDMA) for all returns. Utilizing time-division multiplexing (TDM) for returns has additional technical advantages for mobile terminals. TDM communications are less sensitive to Doppler affects resulting from the movement of mobile terminals. Further, utilizing TDM for returns from mobile terminals reduces synchronization time and fading for incoming transmissions at the gateway and provides for relaxed timing requirements for transmitters on the mobile terminals.

FIG. 1 illustrates an example satellite communications system 100 programmed to utilize time-division multiplexing (TDM) and time-division multiple access (TDMA) simultaneously on the same return bandwidth for returns to a gateway 105.

The satellite communications system 100 includes a gateway 105, a satellite 110, one or more first terminals 115 and one or more second terminals 120. The one or more first terminals 115 and one or more second terminals 120 utilize radio frequency communications to communicate with the gateway 105 via the satellite 110. The gateway 105 may further communicatively couple the first terminals 115 and second terminals 120 with other computing devices 126, for example via a network 125.

Time Division Multiplexing (TDM) multiplexes multiple messages on a single transmission facility by connecting bit streams one at a time at regular intervals, thereby interleaving the messages in time. In an example, a single terminal is transmitting, so it will format the data to be transmitted into time slots. The data is a collection of IP packets from multiple users, such as Internet devices, computers, tablets, mobile phones, etc.

Time Division Multiple Access (TDMA) is used to allocate a discrete amount of frequency bandwidth to each terminal, e.g., second terminal 120, in order to permit simultaneous communications. All of the terminals share the same frequency channel. Each terminal is assigned a specific time slot for transmission. A satellite terminal using TDMA assigns a number of time slots, e.g., 96 timeslots, for each frequency channel, and terminals send bursts or packets of information during each time slot. The packets are reassembled by the receiving equipment into the original message.

The satellite communications system 100 includes uplinks 130, 140, 150 and downlinks 132, 142, 152. Each uplink 130, 140, 150 and downlink 132, 142, 152 includes a respective range of frequencies allocated for radio frequency transmission and has a respective bandwidth. The bandwidth for each uplink 130, 140, 150 and downlink 132, 142, 152 identifies respectively the range of frequencies allocated to each link. Portions of a frequency spectrum available to the satellite communications system 100 are allocated respectively to each of the uplinks 130, 140, 150 and downlinks 132, 142, 152. For ease of discussion, the satellite communications system 100 will be described as including one gateway 105 and one satellite 110. The satellite communications system 100 can, however, include one or more gateways 105 and one or more satellites 110.

The uplinks 130, 140, 150 and downlinks 132, 142, 152 in the satellite communications system 100 can be organized according to Table 1 below:

TABLE 1

Organization of Uplinks and Downlinks

| Link ID | Link Type | Communication From | Communication To | Transmission Type |
|---|---|---|---|---|
| 130 | uplink | gateway 105 | satellite 110 | TDM |
| 132 | downlink | satellite 110 | gateway 105 | TDM/TDMA overlapped |
| 140 | uplink | first terminal 115 | satellite 110 | Switchable between TDM and TDMA |
| 142 | downlink | satellite 110 | first terminal 115 | TDM |
| 150 | uplink | second terminal 120 | satellite 110 | TDMA |
| 152 | downlink | satellite 110 | second terminal 120 | TDM |

The gateway 105 is typically a conventional land-based transmission system and hosts several radio frequency (RF), baseband transport and gateway-specific management operations. Each gateway 105 includes radio frequency electronics (RFE) 160, a first receiver and canceller 162, a second receiver 164, a transmitter 166 and a computer 168.

The radio frequency electronics (RFE) 160 is a set of programmable hardware in the gateway to send and receive radio frequency signals typically including one or more antennas and individual and integrated electronic components such as transistors, power devices, passive components (resistors, capacitors, inductors, etc.), integrated circuits, FPGAs, digital signal processors, etc. programmed to receive a radio frequency signal from the satellite 110 over a bandwidth of the downlink 132 and provide a first signal to the first receiver and canceller 162. The first signal is based on the radio frequency signal received from the satellite, adjusted to power (current and voltage) levels such that the first signal can be processed by the first receiver and canceller 162. In an example, the first signal may be an analog signal used as an input to an analog-to-digital (A/D) converter included in the first receiver and canceller 162. The first signal may include TDM returns and TMDA returns overlapped in frequency within the return bandwidth received by the RFE. The TDM returns originate from one or more first terminals 115 operating in a TDM mode. The TDMA returns originate from one or more second terminals 120 (which only operate in TDM mode) and may further originate from one or more first terminals 115 operating in TDMA return mode. A return, in the present context is a radio frequency transmission from a first or second terminal 115, 120 to the gateway 105.

TDM returns therefore are a plurality of TDM return channels transmitted at a substantially same time, wherein each TDM return channel occupies a portion of the TDM return spectrum. Each TDM return channel may include a plurality of user transmissions, combined in packets and multiplexed in time. A user transmission, in the present context means a user communication, which may be a single event (e.g., a text message) or on-going (e.g., interaction with a website, a telephone conversation, etc.) from or with a user device 190. For example, a first terminal 115 in an airplane, may receive user transmissions from a plurality of user devices 190 on the airplane, multiplex the user transmissions based on time-division multiplexing and transmit the multiplexed user transmissions over a TDM return channel, to the gateway 105.

TDMA returns are a plurality of TDMA return channels transmitted at a substantially same time, wherein each TDMA return channel occupies a portion of the TDMA return spectrum. Each TDMA return channel may be divided into a plurality of TDMA subchannels, each subchannel occupying a portion of the TDMA return channel. Each TDMA subchannel may include a plurality of user transmissions, multiplexed in time in a manner like that employed in TDM channels. For example, a second terminal 120, which may be a terminal in a location, e.g., a home, may receive user transmissions from a plurality of user devices 190 in the home, multiplex the user transmissions based on time-division multiple access, and transmit user transmissions over a TDMA return channel to the gateway 105.

The first signal, output from the RFE 160 to the first receiver and canceller 162, includes TDMA returns and TDM returns that occupy a same allocated return spectrum. An allocated return spectrum (or bandwidth) in the present context means a range of radio frequencies designated by the satellite communications system 100 for transmission of radio frequency signals from the terminals 115/120 to the gateway 105. The allocated return spectrum may be specific for a geographic area, and/or specific for a set of devices (e.g., one or more of the terminals 115/120, the satellite 110, the gateway 105). That is, the TDMA return spectrum and the TDM return spectrum both occupy the allocated return spectrum, and overlap, at least in part. The TDM returns overlapped with the TDMA returns are sometimes referred to herein as TDM/TDMA returns.

The first receiver and canceller 162 includes a processor and memory, the memory storing instructions to program operations of the processor. The receiver and canceller 162 may further include individual and/or integrated electronic components such as transistors, passive components (resistors, capacitors, inductors, etc.), integrated circuits, FPGAs, etc. The first receiver and canceller 162 is communicatively coupled with the computer 168.

The first receiver and canceller 162 is programmed to receive the first signal from the RFE 160 and prepare two output signals; a TDM output signal to the computer 168 including the TDM returns, and a second signal to the second receiver 164 for recovery of the TDMA returns.

In an example, the first receiver and canceller 162 is designed to be inserted "in-line," i.e., in between the RFE 160 and the second receiver 164, such that a standard gateway programmed for TDMA returns can adapted to combined TDM/TDMA returns.

The second receiver 164 includes a processor and memory, the memory storing instructions to program operations of the processor. The second receiver 164 may further include individual and/or integrated electronic components such as transistors, passive components (resistors, capacitors, inductors, etc.), integrated circuits, FPGAs, etc. The second receiver 164 is communicatively coupled with the computer 168.

The second receiver 164 is programmed to receive the second signal from the from the first receiver and canceller 162 and extract the TDMA returns. The second receiver 164 includes programming to perform operations such as filtering, demodulation and forward error correction on the second signal, as are known. The second receiver 164 may apply QPSK, 8PSK or 16PSK demodulation to the second signal. Further, the second receiver 164 may apply forward error correction (FEC) decoding to recapture data included in each TDMA return channel.

The transmitter 166 includes a processor and a memory, the memory storing instructions to program operations of the processor. The transmitter 166 may further include individual and/or integrated electronic components such as transistors, passive components (resistors, capacitors, inductors, etc.), integrated circuits, FPGAs, etc. The transmitter 166 is communicatively coupled with the computer 168.

The transmitter 166 is programmed to receive payload data from the computer 168, and, based on the payload data, generate TDM based forward transmissions to the first and second terminals 115, 120. Forward transmissions, in this context, means transmissions from the gateway 105 to the first and second terminals 115, 120. The payload data may be, for example, payload data from the network 125, received by the computer 168, to forward to user devices 190 via the first and second terminals 115, 120. The transmitter 166 is programmed to perform operations on the data to prepare the data for forward transmission such as modulating the data and encoding the data for forward error correction (FEC).

The gateway 105 further includes the computer 168. The computer 168 includes a processor and a memory, the memory including instructions for programming the processor. The computer 168 is programmed to control communications between the network 125 and the first and second terminals 115, 120. That is, the computer 168 receives returns from users via the first and second terminals 115, 120 and routes them to the network 125, and further receives forward transmissions from the network 125 and transmits the forward transmissions the users via the transmitter 166.

For example, the computer 168 may be programmed to manage load distribution between TDM based returns and TDMA based returns. Returns, as explained above are transmissions from the first or second terminals 115, 120 to the gateway 105; as such, returns can include transmissions over the uplink paths 140, 150 to the satellite 110 and communications over the downlink 132 to the gateway 105. As described in reference to the process 800 below, the computer 168 can assess a relative loading of the TDM channels and the TDMA channels, a respective capability of first terminals 115 operating in the satellite communications system 100, and other factors. Based on the assessment, the computer 168 can instruct a first terminal 115 to switch from TDMA returns to TDM returns or to switch from TDM returns to TDMA returns.

The satellite 110 includes a computer and relay stations and provides two-way radio frequency (RF) communications between the gateway 105 and, respectively, the first terminals 115 and the second terminals 120. The satellite 110 computer is programmed to receive transmissions from the first and second terminals 115, 120, respectively, via the uplinks 140, 150 and transmit the transmissions to the gateway 105 via the downlink 132. The satellite 110 computer is further programmed to receive transmissions from the gateway 105 via the uplink 130 and transmit the transmissions to the first and second terminals 115, 120.

The satellite communications system 100 includes one or more first terminals 115 and one or more second terminals 120. Each first terminal 115 and second terminal 120 is a communications terminal and includes a respective transceiver for RF communications with the satellite 110. Each of the first and second terminals 115, 120 further includes a respective computer 172, 182 that can be programmed to transmit transmissions respectively via uplinks 140, 150 and receive transmissions respectively via the downlinks 142, 152.

First terminals 115 provide communications between user devices 190 and the satellite communications system 100. Each first terminal 115 includes a local area network (LAN) 170 and a computer 172. User devices 190 are computing devices providing users access to network communications, data processing, electronic commerce, etc. Non-limiting examples of user devices include mobile telephones, laptop computers, storage devices, graphic devices, etc. Although a first terminal 115 can be any terminal that includes provisions for TDM returns, first terminals 115 are typically mobile terminals that are intended to be used while in transit such as communications terminals included in airplanes, trains, ships, automobiles, etc. Further, first terminals 115 are typically switchable to utilize TDMA for return transmissions.

The local area network (LAN) 170 can be any suitable network system for communicatively coupling with user devices 190 over a relatively small geographic area, e.g., a building or campus (collection of neighboring or proximate buildings). For example, the local area network (LAN) 170 may include wired mechanisms such as Ethernet and wireless mechanisms such as Wi-Fi® (e.g., operating according to IEEE 802.11) to communicate with the user devices 190. The local area network (LAN) 170 is programmed to communicatively couple the user devices 190 with the computer 172.

The computer 172 is programmed to provide two-way communications between the user devices 190 and the satellite communications system 100. The computer 172 is programmed to receive, from the gateway 105, TDM forward transmissions and forward these transmissions to the user devices 190. The computer 172 is further programed to receive user return transmissions from the user devices 190. Based on the user return transmissions, the computer 172 is programmed to generate returns to the gateway 105. In an example, the computer 172 may be programmed to generate TDM returns. In other cases, the computer 172 may be programmed generate TDMA returns.

Second terminals 120 provide communications between user devices 190 and the satellite communications system 100. Each second terminal 120 includes a local area network (LAN) 180 and a computer 182. The second terminal 120 can be any terminal that includes provisions for TDMA transmissions and does not include provisions for TDM transmissions. Second terminals 120 are typically stationary terminals installed at a location, e.g., in a home.

The local area network (LAN) 180 may be the same or similar as the local area network (LAN) 170 described in reference to the first terminal and is programmed to communicatively couple the user devices 190 with the computer 182.

The computer 182 is programmed to provide two-way communications between the user devices 190 and the satellite communications system 100. The computer 182 is programmed to receive, from the gateway 105, TDM transmissions and forward these transmissions to the user devices 190. The computer 182 is further programed to receive user transmissions from the user devices. Based on the user transmissions, the computer 182 is programmed to generate a return transmission to the gateway 105 based on a TDMA protocol. Second terminals 120 including programming to adjust a timing and frequency allocation of user transmissions based on instructions received from the gateway 105.

The network 125 represents one or more mechanisms by which the gateway 105 may communicate with other computing devices 126. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short-Range Communications (DSRC), 5G/LTE, etc.), local area networks (LAN) and/or wide area networks (WAN), including the Internet, providing data communication services.

The other computing devices 126 can be any conventional computing devices, i.e., including one or more processors and one or more memories, programmed to provide operations such as disclosed herein. The other computing devices 126 can be accessed via the network 125, e.g., the Internet or some other wide area network, and can provide services such as electronic commerce, gaming, access to media, access to news services, etc.

Figure 2:
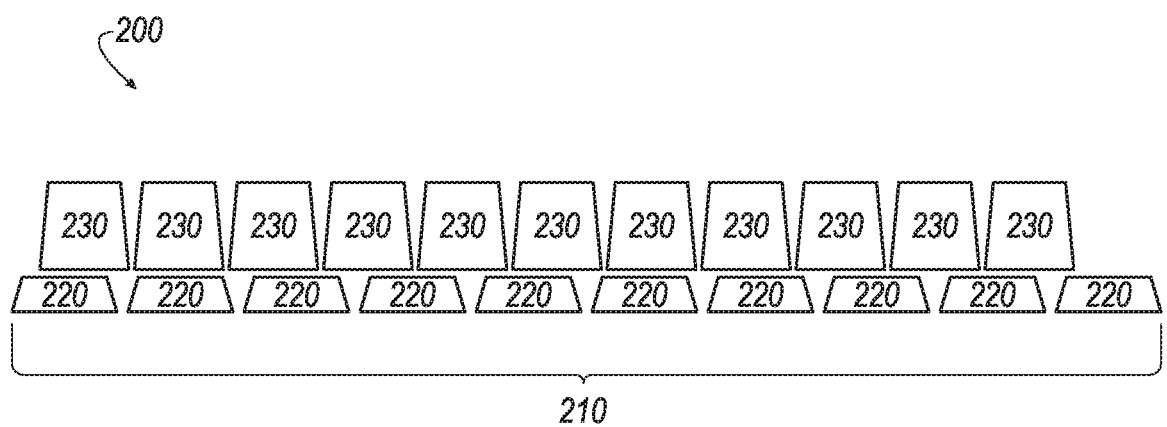
FIG. 2 is an example frequency diagram of time-division multiplexing (TDM) return channels and time-division multiple access (TDMA) return channels utilizing the same return bandwidth.

FIG. 2 is a frequency diagram 200 of an example channel plan for return communications to a gateway 105. A total return spectrum has a frequency bandwidth 210. The frequency bandwidth 210 is divided into a plurality of TDM channels 220 and a plurality of TDMA channels 230. The TDM channels 220 overlap the TDMA channels 230 in frequency.

Because the TDM returns and TDMA returns overlap in frequency, the TDM returns will appear as interference (noise) to the TDMA returns, and vice versa. The satellite system 100 accommodates this overlap by initially setting an Es/No ratio (defined above) for the TDM returns above a threshold value such that the first receiver and canceller 162 can recover the TDM return from the combined (overlapped) TDM/TDMA return. The first receiver and canceller 162, after recovering the TDM return, cancels the TDM return of the TDM/TDMA return, and outputs the resultant difference signal (TDM/TDMA return−TDM return) to the second receiver 164. Cancelling the TDM return from the combined TDM/TDMA return increases the Es/No of the difference component above a second threshold, such that the second receiver 164 can recover the TDMA return.

In an example, a threshold Es/No for TDM returns in the TDM/TDMA return can be specified to be greater than or equal to a TDM recovery threshold to support recovery of the TDM return. The recovery threshold may be determined empirically by testing or monitoring as an Es/No that enables recovery of the TDM return. For example, the TDM recovery threshold may be −2 dB (i.e., negative 2 dB).

Figure 3A:
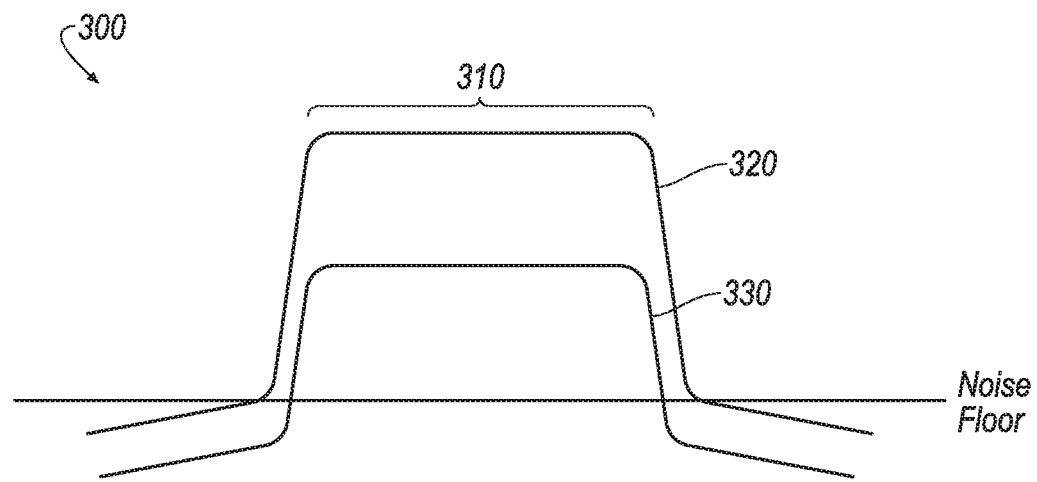
FIG. 3A is an example graph of power versus frequency for a TDMA return and a TDM return before cancellation of the TDM return.
Figure 3B:
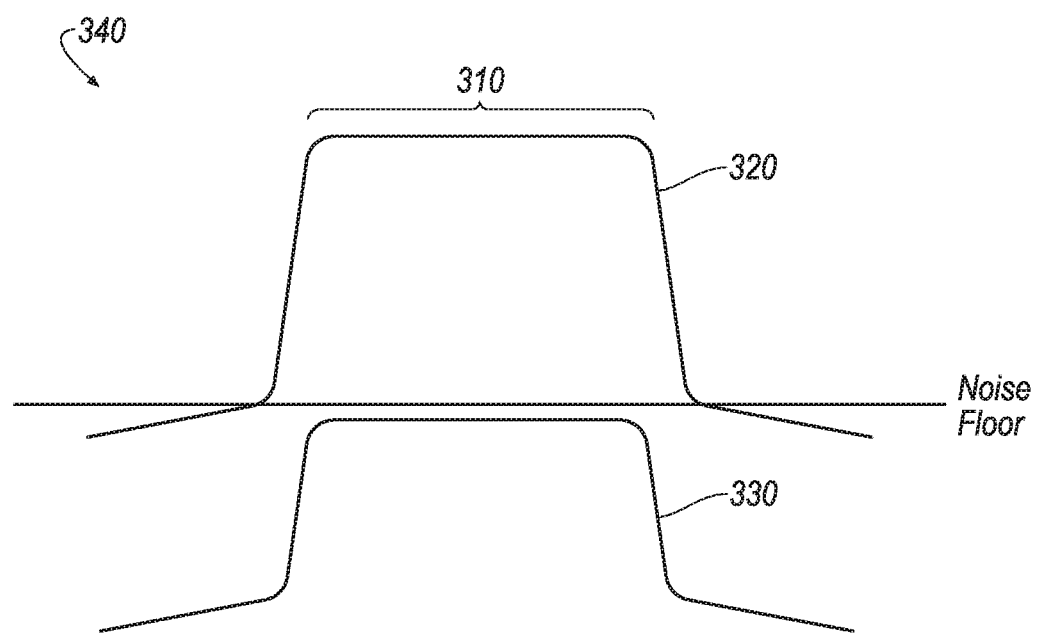
FIG. 3B is an example graph of power versus frequency for a TDMA return and a TDM return after cancellation of the TDM return.

The threshold Es/No for TDMA returns can be specified to be greater than or equal to a TDMA recovery threshold which may also be determined empirically. For example, the TDMA recovery threshold (prior to cancellation of the TDM return) may be 10 dB FIG. 3A illustrates an example graph 300 of a power level of a TDMA return 320 and a power level of a TDM return 330 in a TDM/TDMA return prior to cancellation of the TDM return. FIG. 3B illustrates an example graph 340 of a power level of the TDMA return 320 and a power level of the TDM return 330 in the TDM/TDMA return after cancellation of TDM return. In an example, the interference level of the TDM return is reduced by 15 dB after cancellation.

Figure 4:
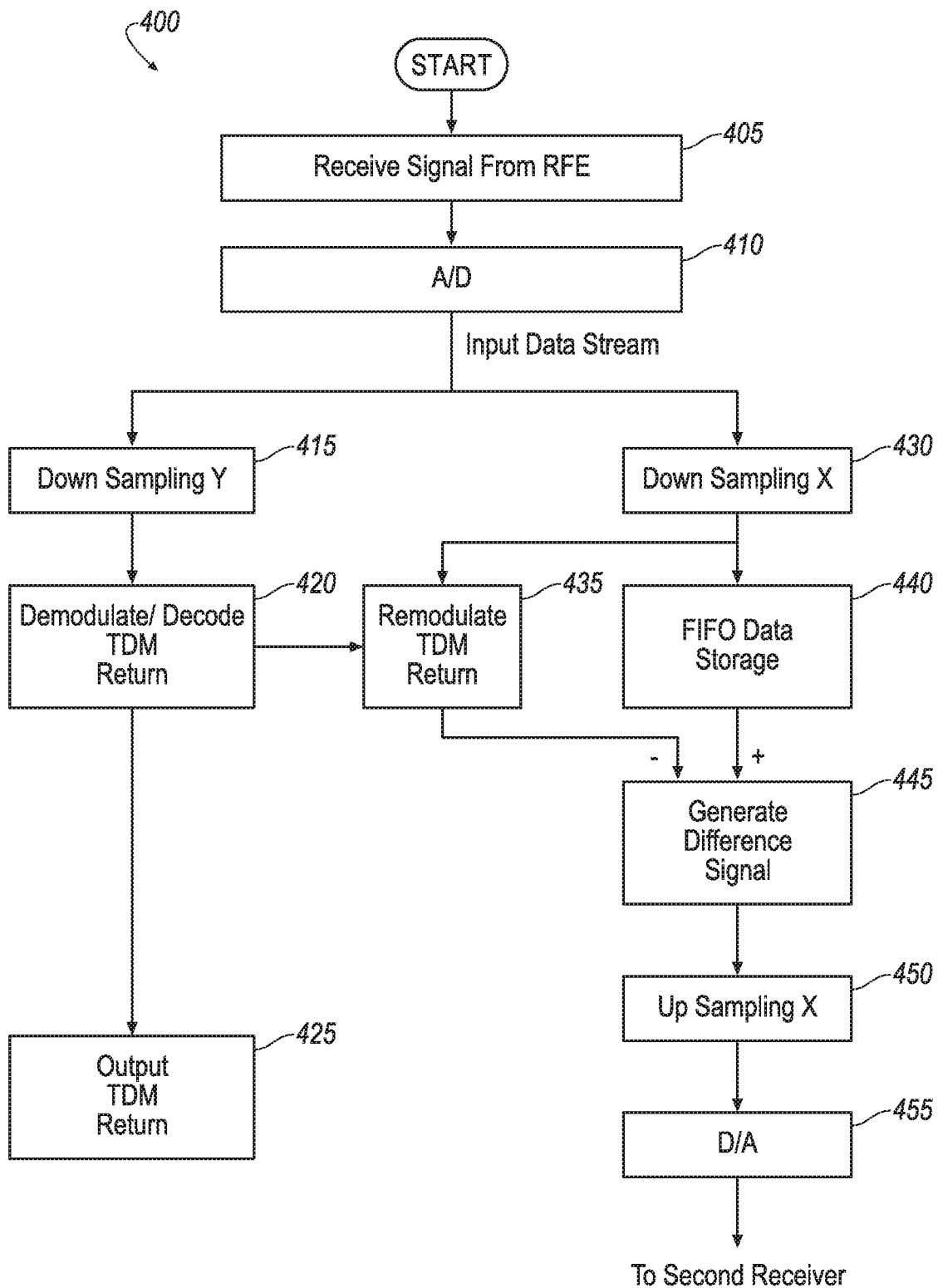
FIG. 4 is a flow chart of an example process for receiving, processing and subsequent cancellation of a TDM return from a combined TDM/TDMA return.

FIG. 4 is a flow chart of an example process 400 for receiving, processing and subsequent cancellation of a TDM return from a combined TDM/TDMA return. The process 400 begins in a block 405.

In the block 405, the radio frequency electronics (RFE) 160 receives a combined TDM/TDMA return. The combined TDM/TDMA return may be QPSK, 8PSK or 16PSK modulated, and includes a TDM return, a TDMA return, and synchronization fields such as unique words and pilots. The transmission contains a unique word that is a known sequence of symbols that can be used to match and confirm reception of a radio frequency transmission. The transmission may further contain one or more pilot symbols that can be used, for example, as frequency references during demodulation. Based on the combined TDM/TDMA return, the radio frequency electronics (RFE) 160 receives and passes the combined frequency spectrum that can be processed by the first receiver and canceller 162. For example, to receive the combined spectrum, the radio frequency electronics (RFE) 160 may apply tuning, and filtering to remove frequency components outside of the allocated return spectrum and amplify the TDM/TDMA return signal to a power and/or voltage level that the first receiver and canceller 162 can process. The first signal includes the TDM return and the TDMA return, wherein the TDMA return may include synchronization fields, and management and user payload information. The radio frequency electronics (RFE) 160 then outputs the first signal to the first receiver and canceller 162. In an example, the range of the allocated return spectrum is 950-2400 MHz, in 125 MHz blocks of spectrum to be processed.

In a block 410, the first receiver and canceller 162 performs analog-to-digital (A/D) conversion on the first signal. The A/D conversion generates a digitized first signal including the TDM return, the TDMA return, and the synchronization characters in a stream of QPSK, 8PSK or 16PSK symbols. For an allocated return spectrum of 125 MHz a sample rate may be 196 megasamples per second (Msamp/s). The digitized first signal is then output to two parallel signal processing paths; a TDM return processing path beginning with the block 415, and a TDMA return processing path, beginning with the block 430. The TDM return processing path in the present context means the steps to process the first signal and output the TDM return payload data to the computer 168; blocks 415, 420 and 425. The TDMA return processing path in the present context means the steps to process the first signal and output the TDMA return to the second receiver 164; that is, the blocks 430, 435, 440, 445, 450 and 455. The TDM return processing path and the TDMA return processing path are implemented in parallel such that outputs of the TDM return processing path are available for use in the TDMA return processing path, for example, in the block 435 as described below.

In a block 415, in a first step of a TDM return processing path, the first receiver and canceller 162 reduces a sample rate of the first signal by a first down-sample factor to generate a first down-sampled first signal having a first down-sample rate. The first down-sample rate is lower than the sample rate utilized for the A/D conversion. In an example, for an A/D sample rate of 196.608 Msamp/s, the first receiver and canceller 162 may reduce the sample rate of the digitized first signal to a first down-sample rate of 5.12 MSamps/s. The first down-sample factor is given by equation 1:

$$\text{First down sample factor} = \text{sample rate } (A/D)/\text{first down-sample rate} \qquad \text{eq. 1}$$

In the example, the first down sample factor=(196.608 MSamps/s)/(5.12 MSamps/s)=38.4.

Down sampling reduces the number of samples (i.e., the amount of data) that needs to be processed, and accordingly reduces the amount of processing power required to perform subsequent processing steps. Additionally or alternatively, the first receiver and canceller 162 may apply decimation to generate the first down-sampled first signal. The process 400 continues in a block 420.

In the block 420, the first receiver and canceller 162 recovers the TDM return from the first down-sampled first signal and further recovers the payload data (user transmissions) from the recovered TDM return. The receiver acquires the first down-sampled first signal burst by burst, determining parameters of the first down-sampled first signal including the burst timing, frequency tracking, the burst symbol timing, the frequency offset and the burst signal amplitude. After acquisition of the first down-sampled first signal, the receiver and canceller 162 demodulates and decodes the first down-sampled first signal to produce the TDM return payload data (i.e., the user transmissions). Upon completion of these receiver operations, the process 400 continues in a block 425.

In the block 425, the first receiver and canceller 162 outputs the TDM return payload data to the computer 168, which may, for example, transmit the data via network 125 to other computing devices 126 as described above. The processing of the TDM return signal path ends with the block 425.

In a block 430, in a first step of a TDMA return signal path, the first receiver and canceller 162 generates a second down-sampled first signal from the digitized first signal (output of the A/D conversion described in reference to the block 410).

In the block 430, the first receiver and canceller 162 reduces a sample rate of digitized first signal by a second down-sample factor to generate a second down-sampled first signal at a second down-sample rate. The second down-sample rate may be higher than the first down-sample rate. In an example, the second down-sample rate is 30.72 MSamps/s. The first down-sample factor is given by equation 2:

$$\text{Second down sample factor} = \text{sample rate } (A/D)/\text{second down-sample rate} \qquad \text{eq. 2}$$

In the example, the second down sample factor=(196.608 MSamps/s)/(30.72 MSamps/s)=6.4. Additionally, or alternatively, the receiver and canceller 162 may apply decimation to generate the second down-sampled first signal. The process 400 then continues in a block 435.

In the block 435, the first receiver and canceller 162 reproduces the TDM return in preparation for subtracting the TDM return from the combined TDM/TDMA return in the TDMA return signal path. The first receiver and canceller 162 utilizes an initial frequency offset, burst timing and symbol timing estimates as determined in the block 420 to perform a more refined symbol timing estimate through the use of unique word correlation at the second down-sample rate. The first receiver and canceller 162 re-encodes the information bits received from the decoder, reinserts the unique word, performs matched filtering at the down-sample sample rate of the TDMA signal path, and remodulates the assembled TDM return. In a case that pilot symbols are utilized, the first receiver and canceller 162 may further reinsert pilot symbols. The symbol timing is adjusted to the previously determined received symbol timing. As the frequency offset is reintroduced, the samples are then scaled by the estimated symbol energy prior to subtracting from the samples in the TDMA signal path.

In a block 440, in parallel to the block 435, the first receiver and canceller 162 temporarily stores, for example in a first-in first out data (FIFO) data storage, the second down-sampled first signal. This storage serves to delay the second down-sampled first signal to synchronize the second down-sampled first signal with the remodulated TDM return from the block 435.

In a block 445, the receiver and canceller 162 subtracts the remodulated TDM return, received from the block 435, from the delayed second down-sampled first signal. The resulting difference signal includes the second down-sampled first signal with the TDM return cancelled. Cancelled in this context means that interference of the TDM return in the difference signal is suppressed, i.e., reduced in power. An example of the effectiveness of suppression is described in reference to FIG. 7 below. Upon generation of the difference signal (i.e., cancellation of the TDM return in the second down-sampled first signal), The process continues in a block 450.

In the block 450, the first receiver and canceller 162 increases a sample rate of the difference signal by an up-sample factor and/or interpolates the difference signal to regenerate the digitized first signal, with the TDM return cancelled. In an example, the sample rate is increased to the 196.608 MSamps/s of the original first signal. The process 400 continues in a block 455.

Next, in the block 455, the first receiver and canceller 162 applies digital to analog (D/A) conversion the digital first signal with the TDM return to generate a second signal. The second signal is a reconstructed first signal with the TDM return cancelled. The first receiver and canceller 162 then outputs the second signal to the second receiver 164. The TDMA return processing path ends after outputting the second signal to the second receiver 164. The process 400 may continue upon receipt of a subsequent TDM/TDMA return. Further, the process 400 may operate continuously, i.e., blocks late in the process 400 may be processing a first TDM/TDMA return, and simultaneously, blocks earlier in the process 400 may be processing a subsequent TDM/TDMA return.

As described above, the second receiver 164 is programmed conventionally to receive the second signal from the from the first receiver and canceller 162 and extract the TDMA returns. The second receiver 164 outputs the TDMA return payload data to the computer 168 which may, for example, transmit the data via network 125 to other computing devices 126 as described above.

Figure 5:
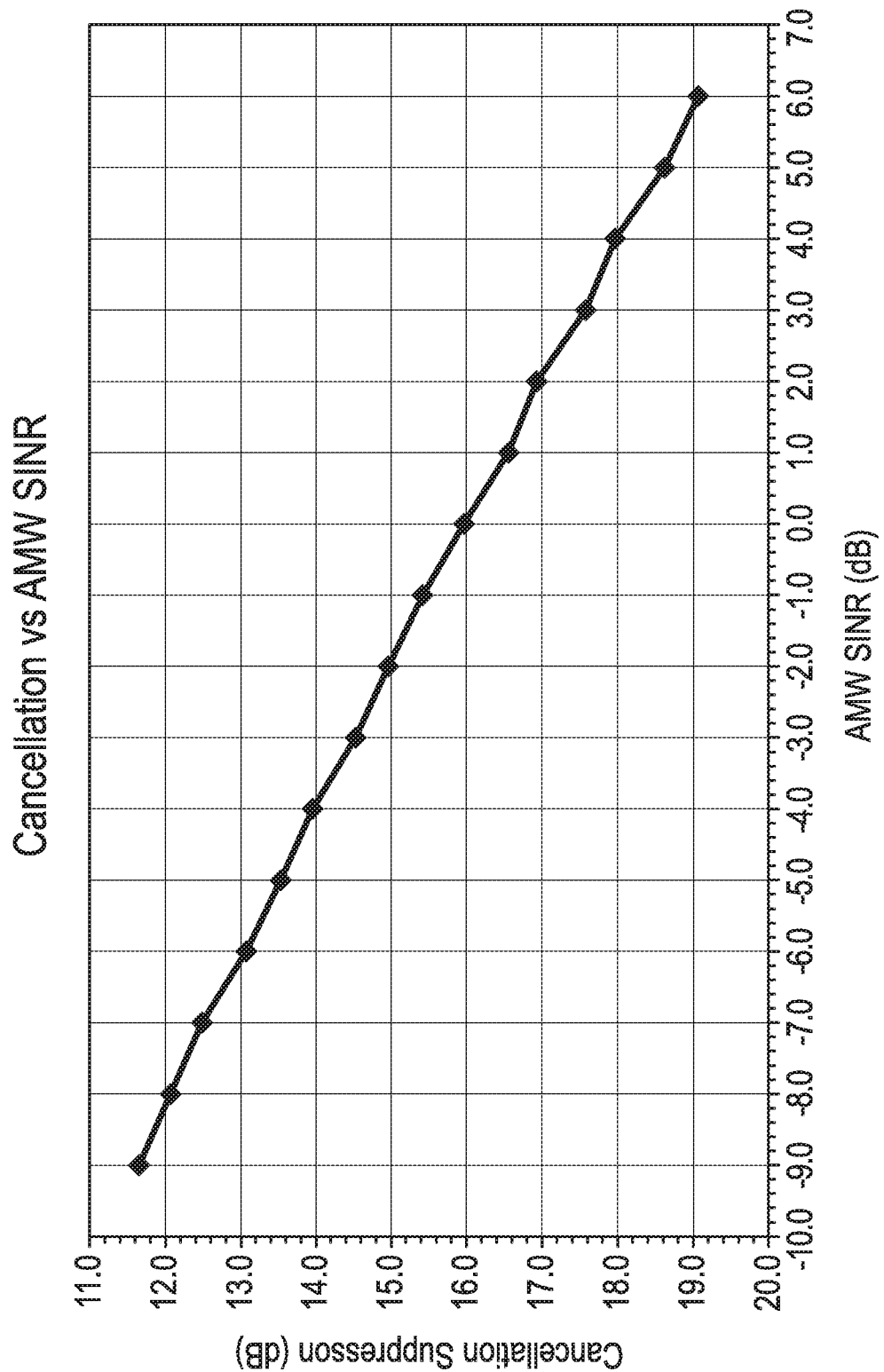
FIG. 5 is an example graph of cancellation suppression as a function of the signal-to-noise-plus-interference ratio (SINR) of a TDM return.

FIG. 5 is an example graph of cancellation suppression (vertical axis) as a function of the signal-to-noise-plus-interference ratio (SINR) (horizontal axis) of the TDM return in the first signal, which illustrates an example effectiveness of cancellation suppression. Signal-to-noise-plus-interference ratio is a quantity used to give theoretical upper bounds on channel capacity (or the rate of information transfer) in wireless communications systems. The SINR is defined as the power of a certain signal of interest (in this case the TDM return) divided by the sum of the interference power (from all the other interfering signals) and the power of some background noise.

In the example, for an SINR of −2 dB for the TDM return, the cancellation process, according to FIG. 5, requires 15 dB of suppression.

The operations described in the process 400 are described as being executed by the first receiver and canceller 162. The operations, however, may be executed, in part or in whole, by other computing devices. For example, the computer 168 in the first receiver and canceller 162 may execute a portion of the processing described above for the process 400.

Figure 6:
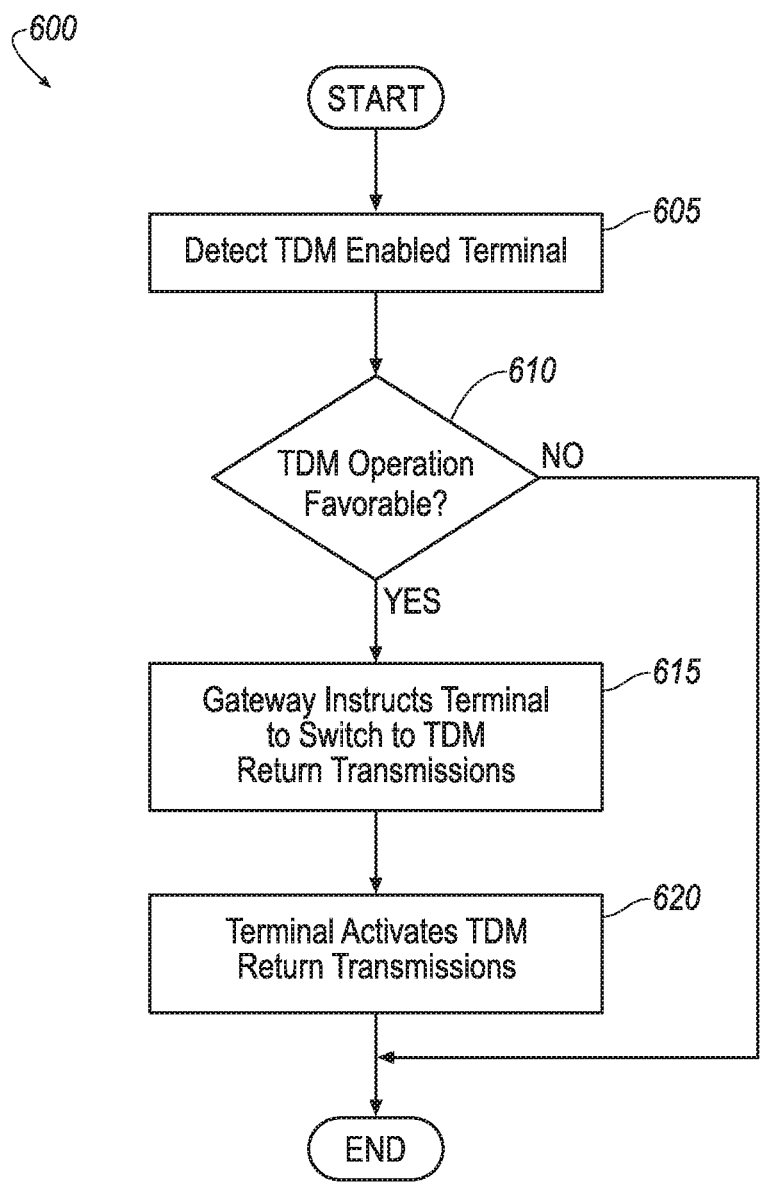
FIG. 6 is a flow diagram for an example process to switch a terminal from TDMA return communications to TDM return communications.

FIG. 6 is a flow diagram of an example process 600 to switch return communications of a time-division multiplexing (TDM) enabled first terminal 115 in a satellite communications system 100 from time-division multiple access (TDMA) returns to time-division multiplexed (TDM) transmissions. TDM enabled, in this context means that the terminal includes provisions (hardware and software) for generating TDM returns. The gateway 105, upon detecting that a TDM enabled first terminal 115 is utilizing time-division multiple access (TDMA) for returns, may, based on operating conditions of the satellite communications system 100, send instructions to the first terminal 115 to activate time-division multiplexed (TDM) returns. The process 600 begins in a block 605.

In the block 605, the gateway 105 detects a TDM enabled first terminal 115. In an example, the gateway 105, receives, via a second receiver 164, a TDMA return from the first terminal 115. Based on data included in the TDMA return, the gateway 105 determines that the terminal transmitting the return transmission is a TDM enabled terminal. For example, the data in the TDMA return may include identification data of the terminal. Based on the identification data, the gateway 105 may determine that the terminal is a first terminal 115 that is TDM enabled. The process 600 continues in a block 610.

In the block 610, the gateway 105 may determine whether a TDM channel is available for the first terminal 115. For example, the gateway 105 may maintain a table or the like of TDM channels indicating a current status of each channel. The gateway 105 may further evaluate a relative loading of the TDM channels and TDMA channels. Based on the relative loading of the TDM channels and TDMA channels, the gateway 105 may determine that it is advantageous to switch the first terminal 115 from TDMA based operation to TDM based operation.

In another example, a first terminal 115 may be prioritized for TDM operation. The gateway 105, upon receiving identification of the first terminal 115, may switch the first terminal on a prioritized basis to TDM operation.

In a case that the gateway 105 determines that the first terminal 115, based on satellite communication system 100 conditions, the process 600 continues in a block 615. Otherwise, the process 600 ends.

In the block 615, the gateway 105 sends instructions to the first terminal 115 to switch to TDM operation for return transmissions. The instructions may include identification of a TDM channel to be used by the first terminal 115. The process 600 continues in a block 620.

In the block 620, the first terminal 115, based on instructions from the gateway 105, begins transmitting returns according to a TDM protocol. The process 600 ends.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

As used herein, the term "based on" means based on in whole or in part.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claimed invention.

We claim:

1. A system comprising:
    a satellite communications gateway that includes:
        a first receiver including a first processor and a first memory, the first memory including first instructions such that the first processor is programmed to:
            receive a first signal including a time-division multiplexed (TDM) return and a time-division multiple access (TDMA) return overlapped in an allocated frequency range;
            recover the time-division multiplexed return from the first signal;
            reduce a sample rate of the first signal by a first down-sample factor prior to recovery of the time-division multiplexed return;
            output the time-division multiplexed return;
            cancel the time-division multiplexed return in the first signal to generate a second signal;
            reduce the sample rate of the first signal by a second down-sample factor prior to cancelling the time-division multiplexed return in the first signal to generate the second signal; and
            output the second signal to a second receiver.

2. The system of claim 1, further comprising the second receiver, wherein:
    the second receiver includes a second processor and a second memory, the second memory including second instructions such that the second processor is programmed to:
        recover the time-division multiple access return from the second signal, and
        output the time-division multiple access return.

3. The system of claim 1, wherein cancelling the time-division multiplexed return in the first signal to generate the second signal includes:
    remodulating the TDM return after recovery.

4. The system of claim 3, wherein cancelling the time-division multiplexed return in the first signal to generate the second signal includes:
    subtracting the remodulated TDM return from the first signal.

5. The system of claim 3, wherein cancelling the time-division multiplexed return in the first signal to generate the second signal includes:
    delaying the first signal to synchronize the first signal with the remodulated TDM return.

6. The system of claim 1, wherein the first processor is further programmed to:
    increase a sample rate of the second signal prior to outputting the second signal to the second receiver.

7. The system of claim 1, comprising:
    a first terminal enabled for both time-division multiplexed returns and time-division multiple access returns; and
    a second terminal enabled for time-division multiple access returns and not enabled for time-division multiplexed returns; wherein the time-division multiplexed returns are received from the first terminal and the time-division multiple access returns are received from the second terminal.

8. The system of claim 7, wherein the first terminal is a mobile terminal and the second terminal is a stationary terminal.

9. The system of claim 7, wherein the first terminal includes a third processor and a third memory, the third memory including third instructions such that the first terminal is programmed to:
    initiate communications with the satellite communications gateway based on time-division multiple access returns; and
    switch to communications based on time-division multiplexed returns based on instructions received from the satellite communications gateway.

10. A method comprising:
    receiving, in a first receiver, a first signal including a time-division multiplexed (TDM) return and a time-division multiple access (TDMA) return overlapped in an allocated frequency range;
    recovering the time-division multiplexed return from the first signal;
    reducing a sample rate of the first signal by a first down-sample factor prior to recovery of the time-division multiplexed return;
    outputting the time-division multiplexed return;
    cancelling the time-division multiplexed return in the first signal to generate a second signal;
    reducing the sample rate of the first signal by a second down-sample factor prior to cancelling the time-division multiplexed return in the first signal to generate the second signal
    outputting the second signal to a second receiver.

11. The method of claim 10, further comprising:
recovering, in the second receiver, the time-division multiple access return from the second signal, and
outputting the time-division multiple access return.

12. The method of claim 10, wherein cancelling the time-division multiplexed return in the first signal to generate the second signal includes:
remodulating the TDM return after recovery.

13. The method of claim 12, wherein cancelling the time-division multiplexed return in the first signal to generate the second signal includes:
subtracting the remodulated TDM return from the first signal.

14. The system of claim 12, wherein cancelling the time-division multiplexed return in the first signal to generate the second signal includes:
delaying the first signal to synchronize the first signal with the remodulated TDM return.

15. The method of claim 10, further comprising:
increasing a sample rate of the second signal prior to outputting the second signal to the second receiver.

16. The method of claim 10, wherein:
a first terminal is enabled for both time-division multiplexed returns and time-division multiple access returns; and
a second terminal is enabled for time-division multiple access returns and not enabled for time-division multiplexed returns; wherein the time-division multiplexed returns are received from the first terminal and the time-division multiple access returns are received from the second terminal.

17. The method of claim 16, wherein the first terminal is a mobile terminal and the second terminal is a stationary terminal.

18. The method of claim 16, further comprising:
initiating communications with a satellite communications gateway based on time-division multiple access returns; and
switching to communications based on time-division multiplexed returns based on instructions received from the satellite communications gateway.

* * * * *